T. H. COBURN.
BRICKLAYER'S TOOL.
APPLICATION FILED AUG. 6, 1915.

1,193,665.

Patented Aug. 8, 1916.

UNITED STATES PATENT OFFICE.

THOMAS H. COBURN, OF ORANGEVILLE, MARYLAND.

BRICKLAYER'S TOOL.

1,193,665.

Specification of Letters Patent.  Patented Aug. 8, 1916.

Application filed August 6, 1915. Serial No. 43,930.

*To all whom it may concern:*

Be it known that I, THOMAS H. COBURN, a citizen of the United States, residing at Orangeville, in the county of Baltimore and State of Maryland, have invented certain new and useful Improvements in Bricklayers' Tools, of which the following is a specification.

This invention relates to devices for holding gage-lines for masonry work, and its object is to provide a simple and efficient device of this kind, and one which can be easily and quickly positioned at the proper place on the wall, and which will hold the gage-line securely and true.

The invention also has for its object to provide a holder of the kind stated which has a part that can be used as a rake or scraper for finishing the seams of the wall.

A further object of the invention is to provide a pointing tool, and to so shape the holder that said tool may be mounted thereon.

The objects stated are attained by means of a novel combination and arrangement of parts to be hereinafter described and claimed, reference being had to the accompanying drawing, in which—

Figure 1:
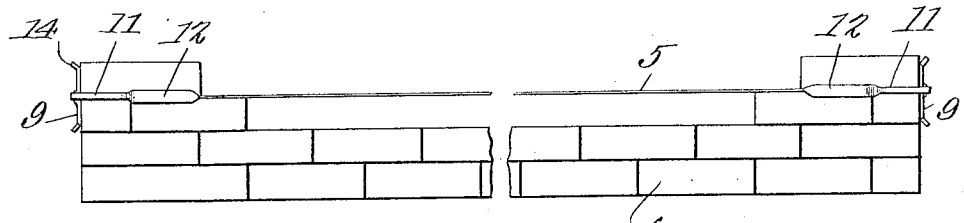
Figure 2:
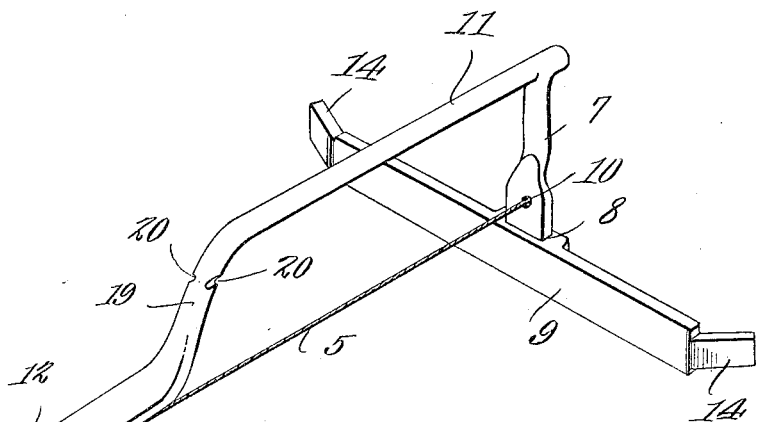
Figure 3:
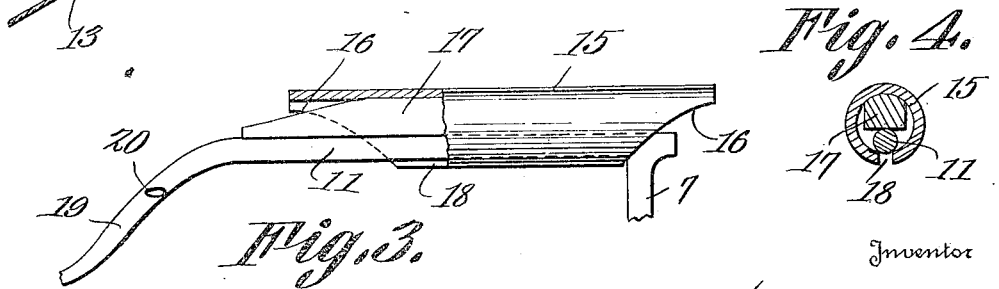
Figure 4:

Figure 1 is an elevation showing the application of the device; Fig. 2 is a perspective view of one end of the device; Fig. 3 is an elevation, partly in section, of a pointing tool, showing how the same is supported by the holder for the gage-line, and Fig. 4 is a cross section of Fig. 3.

Referring specifically to the drawing, 5 denotes a gage-line for masonry work, the same being attached at each end to a holder, whereby it may be positioned on a wall 6 as shown in Fig. 1. As the holders are alike in construction, a description of one suffices for both.

The holder referred to comprises a shank 7 which is squared at one end to seat non-rotatably in a socket 8 in a base bar 9, said shank having at this end an aperture 10 to receive one end of the line 5, the same being made fast in any suitable manner. The outer end of the shank has an integral, laterally projecting arm 11 which is offset at its extremity toward the line, as indicated at 12, and also here flattened. The line extends along the offset, in contact with the outer portion thereof, and the latter has a longitudinal groove 13 in which the line seats, whereby it is held straight and true.

The base bar 9 is of sufficient length to provide a stable support for the shank 7, and it is placed vertically against the end of the wall 6, as shown in Fig. 1, the side of the bar which seats against the wall being straight.

A holder as hereinbefore described is applied to each end of the line 5. The base bars 9 are clamped to the ends of the wall 6 and prevented from slipping down by the tension of the line.

The part 7 to which the line 5 is connected is removably attached to the base bar 9 in order that the latter may be used as a scraping tool after removing said part 7, with the line. For this purpose, the ends of the bar have blades 14 which extend from the bar at an oblique angle. The blades are employed for removing or raking out the superfluous mortar between the bricks, and smoothing the remaining mortar, to give the joint or seam a neat and finished appearance. The blades 14 are of different widths to adapt the tool for different widths of seams.

Fig. 3 shows a pointing tool 15 of cylindrical form having beveled ends 16. This tool may be slipped over the arm 11, and it is held in place thereon by a wedge 17 inserted into the cylinder as shown in Fig. 3, and jammed against the arm, the inside diameter of the cylinder being large enough to accommodate the arm and the wedge. In order that the cylinder may be slipped over the arm 11, it has a longitudinal slot 18 to clear the portion 19 of the arm 11 which joins the latter with the offset 12, said portion 19 having opposite side notches 20 whereby the same is here reduced in width sufficiently to pass the slot 18.

I claim:

1. A holder for masonry gage-lines, comprising a shank having means at its inner end for attaching one end of the line and a lateral arm extending from its outer end at right-angles thereto, said lateral arm being adapted to be positioned in spaced parallel relation to the line and formed with an offset extremity which lies substantially in alinement with the line attaching means at the inner end of the shank, said offset extremity adapted to support said line intermediate its ends, and a base bar secured to the inner end of said shank and having ends extending at right-angles from the shank and provided with a flat face which lies substantially in the same plane of the inner face of said shank.

2. A holder for masonry gage-lines, comprising a shank having means at its inner end for attaching one end of the line and a lateral arm extending from its outer end at right-angles thereto, said lateral arm being adapted to be positioned in spaced parallel relation to the line and formed with an offset extremity which lies substantially in alinement with the line attaching means at the inner end of the shank, said offset extremity being grooved to support said line intermediate its ends, and a base bar secured to the inner end of said shank and having ends extending at right-angles thereto and provided with a flat face which is flush with the inner face of the shank.

In testimony whereof I affix my signature in presence of two witnesses.

THOMAS H. COBURN.

Witnesses:
E. WALTON BREWINGTON,
R. M. JONES.

Copies of this patent may be obtained for five cents each, by addressing the "Commissioner of Patents, Washington, D. C."